(No Model.)
C. M. GRANNIS.
MACHINIST'S GAGE AND GAGE HOLDER.
No. 451,123. Patented Apr. 28, 1891.
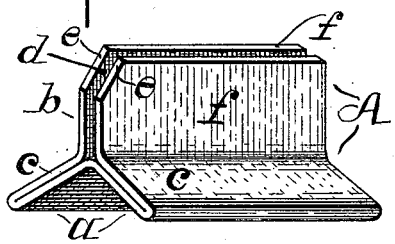
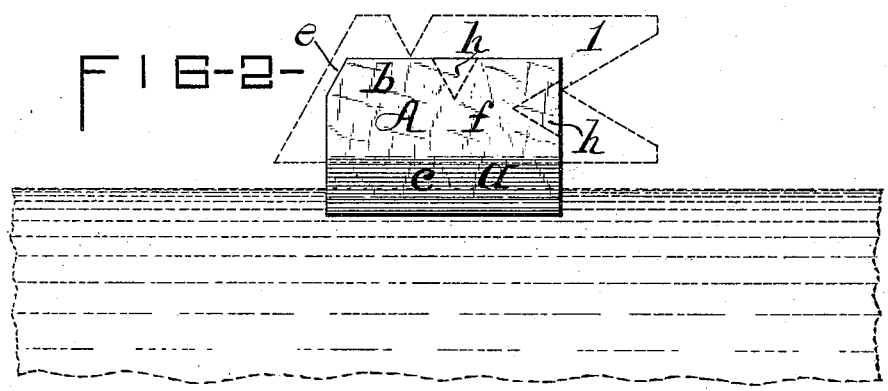
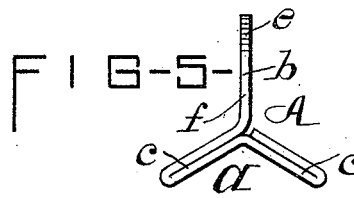
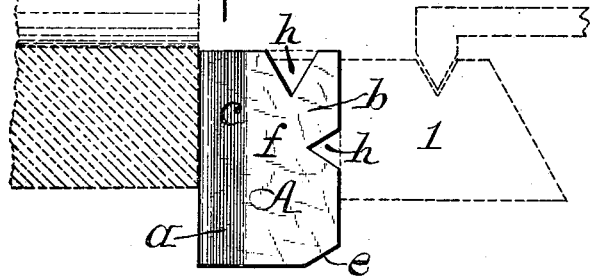
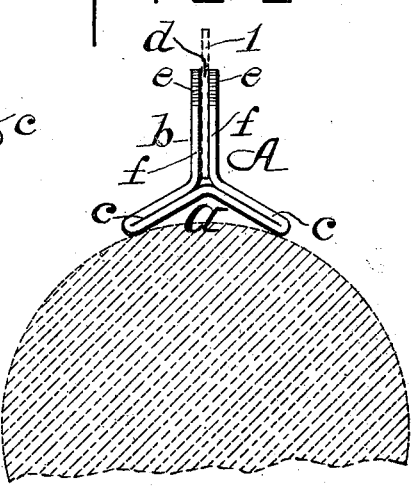
ATTEST—
E. Butler
W. Sears
INVENTOR—
Charles M. Grannis,
per Wm. C. Raymond, his Att'y

UNITED STATES PATENT OFFICE.

CHARLES M. GRANNIS, OF SYRACUSE, NEW YORK, ASSIGNOR OF ONE-HALF TO CHARLES S. GRANNIS, OF SAME PLACE.

MACHINIST'S GAGE AND GAGE-HOLDER.

SPECIFICATION forming part of Letters Patent No. 451,123, dated April 28, 1891.

Application filed February 27, 1890. Serial No. 342,017. (No model.)

*To all whom it may concern:*

Be it known that I, CHARLES M. GRANNIS, a citizen of the United States, residing at Syracuse, in the county of Onondaga and State of New York, have invented certain new and useful Improvements in a Combined Gage and Gage-Holder; and I do hereby declare the following to be a full, clear, and exact description of the invention, such as will enable others skilled in the art to which it appertains to make and use the same, reference being had to the accompanying drawings, in which—

Figure 1 is an isometric view of my combined gage and gage-holder; Fig. 2, a side elevation of my device; Fig. 3, an end elevation thereof; Fig. 4, a side elevation of my instrument, slightly-modified form, and shown disposed vertically on end; and Fig. 5, an end elevation illustrating a modification in construction.

Like letters and figures of reference denote corresponding parts throughout the several views of the drawings.

The object of my invention is the construction of a combined gage and gage-holder adaptable for utilization and service as a gage *per se* or as a gage and a holder for an auxiliary gage conjointly—that is, applicable for varied and general use or service by machinists, mechanics, and artisans generally—which combines in one instrument simplicity with durability, also perfect adaptability and accuracy for the manifold uses it is susceptible of being utilized for, either as a gage solely or a holder as well as a gage.

My device is constructed as follows:

A designates my combined gage and gage-holder (or gage) comprising a base $a$ of angular or $\wedge$-shaped contour in cross-section, provided with a standard $b$, rising from or in proximity to the apex portion of the aforesaid base $a$ and standing substantially perpendicular thereto. Said angular or $\wedge$-shaped base $a$ comprises the inclined portions $c\ c$, that converge together.

The standard $b$, which preferably is formed integral with the base $a$, has a longitudinal vertical slot $d$ of slight width, which extends from the top thereof down to or adjacent to the apex portion of the angular base $a$, and in which slot there is adapted to be inserted and held through the frictional or compressible contact of the adjacent perpendicular walls $f f$, forming the slot, an auxiliary gage or rule 1 of plate metal, that may be of any preferred length or height and of desired shape or contour at its edges.

It will be observed that the formation of the walls $f f$, bounding the slot $d$, are such as to admit of the free accessibility of an auxiliary gage or plate at either the top of the slot or its extremities, a clear passage-way invariably being assured. The adjacent ends of the walls $f f$ of the standard $b$ respectively terminate in an inclined or slanting extremity $e$, the edges being parallel one to the other and longitudinal to the direction of the standard, as illustrated. Said parallel inclined ends or edges $e\ e$ I usually form at an incline or angle of sixty degrees, that being the proper inclination therefor to obtain the best and most satisfactory results with my instrument in its employment as a gage, particularly in adjusting a tool for cutting a screw having V-threads, as is self-evident.

It will readily be perceived from the foregoing that by my aforedescribed construction I obtain a combined gage and gage-holder that is to all intents and purposes a complete gage in itself, while, when deemed requisite or expedient to utilize an auxiliary gage, rule, or other plate, a reliable and satisfactory holder is afforded therefor.

When preferred or deemed desirable, I cut or otherwise form V-shaped notches $h$ in the respective walls $f f$ of the standard $b$ diametrically or lineally opposite each other, the inclined edges creating said V-shaped notches usually being formed at an incline or angle of sixty degrees, as illustrated in Fig. 2 by dotted lines and in Fig. 4 by full lines.

Preferably I utilize the construction embodying simply the inclined or angular edges $e$, as I find in practice that such simplified or restricted form fulfills all usual or ordinary requirements.

In case I desire to limit or curtail the construction of my instrument to such a degree as to render it serviceable as a gage exclusively, and not capable of additionally serving as a holder or clamp for an auxiliary gage or other plate, I adopt the modified construction illustrated in Fig. 5 of the drawings, wherein I dispense with the slot $d$ in the standard $b$, (preferably integral with the base $a$,) and reducing the thickness of said standard portion consequent upon the dispensing of the slot $d$ and coincidently one of the walls $f$, and thereby creating a non-slotted standard of suitable thickness. While this last-described modified formation is of value to a certain extent, it is obvious that it does not possess the degree of utility, advantages, or usefulness embraced by my main and preferred construction.

Although preferably I construct my device out of an integral blank of sheet metal bent or otherwise formed to proper shape, as illustrated in the figures of the drawings, it is apparent that blocks of cast or other metal may be utilized in the manufacture of my instrument by the cutting or milling thereof into required form. However, the utilization of properly-formed blanks of sheet metal insure greater ease and rapidity of manufacture and at a comparatively trifling expense, and producing, when formed to shape, an article combining the elements of strength, durability, and requisite elasticity, and therefore obviously preferable over those cut or milled out of blocks of metal to suitable form.

In Fig. 2 of the drawings I illustrate by dotted lines and work the application of my gage and gage-holder as a threading-tool gage for outside work, and in Fig. 3 I also illustrate the same feature, the cylinder being shown in transverse section by dotted work.

Fig. 4 illustrates the application of my instrument for use as a threading-tool gage for inside work or service, an auxiliary gage-plate, a portion of a threading-tool, and a fragment of a cylinder shown in longitudinal section being represented by dotted lines and work.

The foregoing merely exemplify a few of the many and varied uses to which my combined gage and gage-holder is applicable, it obviously being unnecessary, in fact almost impossible, to illustrate specifically all of the uses for which my instrument is susceptible of employment in varied forms of application in the determination of desired and correct inclinations or angles of cutting-tools, &c., readily obtainable through the variation of the positions of my instrument either alone or in conjunction with an auxiliary gage-plate.

It is obvious that my improved gage and gage-holder is susceptible of modification to a greater or less degree or of unimportant variations in its detail construction or formation without involving a departure from the full intent or scope of my invention.

Having described my invention, what I claim as new, and desire to secure by Letters Patent, is—

1. In a combined gage and gage-holder, a base of angular or Λ form in cross-section, provided with a standard rising from its apex portion, said standard having one or more inclined or angular edges longitudinal thereto, in combination, substantially as described and shown.

2. The combination, in a combined gage and gage-holder, of a base portion of angular or Λ shape in cross-section with a vertically-slotted standard provided with one or more inclined or angular edges disposed longitudinally thereto, said standard rising perpendicularly from the apex portion of the Λ-shaped base, substantially as described.

3. In a combined gage and gage-holder, a base of angular or Λ form in cross-section, a slotted standard rising perpendicularly from or about the apex of said base, and V-shaped notches formed in one or more of the edges of the standard and lineally therewith, substantially as described.

4. A combined gage and gage-holder consisting of a base portion of desired length that is of angular or Λ form transversely, provided with a vertically-slotted standard open at its top, that stands perpendicularly from the apex of and lineally with said base and extending continuously from one extremity to the opposite extremity of said base portion, and thereby adapting the slotway of said standard to form a continuous seat or bearing for an auxiliary gage-plate throughout the length of the instrument, substantially as shown and described.

5. A combined gage and gage-holder consisting of a base of angular or Λ form in cross-section, a vertically and longitudinally slotted standard rising from its apex portion lineally with the base and adapted through the elasticity or spring of the adjacent and parallel walls of its slotway to yieldingly and compressively grip and retain therein through lateral contact an auxiliary gage plate, substantially as shown and described.

In testimony whereof I affix my signature, in presence of two witnesses, this 28th day of January, 1890.

CHARLES M. GRANNIS. [L. S.]

Witnesses:
WM. C. RAYMOND,
CHAS. S. GRANNIS.